E. L. PRATT.
Milk Pan.
No. 23,429.
Patented March 29, 1859.
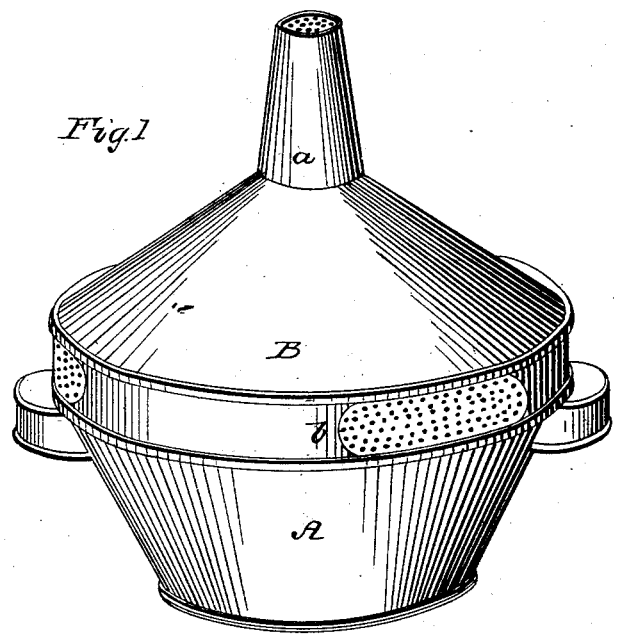
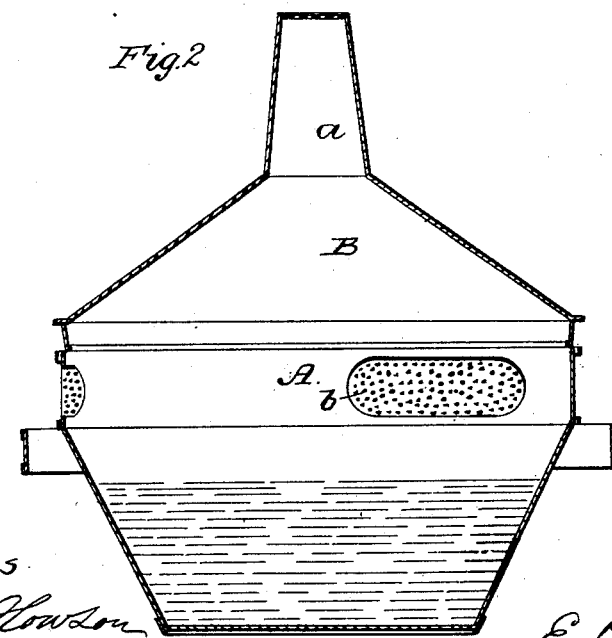
WITNESSES
INVENTOR

UNITED STATES PATENT OFFICE.

E. L. PRATT, OF PHILADELPHIA, PENNSYLVANIA, ASSIGNOR TO HIMSELF AND R. B. FITTS, OF SAME PLACE.

IMPROVED MILK-PAN.

Specification forming part of Letters Patent No. 23,429, dated March 29, 1859.

*To all whom it may concern:*

Be it known that I, E. L. PRATT, of the city of Philadelphia and State of Pennsylvania, have invented a new and useful Improvement in Milk-Pans; and I do hereby declare the following to be a full, clear, and exact description of the same, reference being had to the accompanying drawings, and to the letters of reference marked thereon.

My invention relates to an improvement in pans used in dairies for receiving the milk from which the cream has to be separated; and my improvement consists in constructing a pan with a detachable or hinged cover, forming in combination a vessel closed on all sides, with the exception of a series of minute perforations below for the access of cold air and another series above for the free escape of warm air and gases.

The object of my improvement is to expose the surface of the milk to a constant current of cold air, necessary for the rapid and effectual development of the cream, and at the same time to exclude those insects which infest the spring-houses and cellars of dairy-farms and gain access to the milk exposed in the usual unprotected pans.

My improved pans are also applicable to the storing of bread, cakes, and other cooked articles of diet.

In order to enable others to make and use my invention, I will now proceed to describe its construction and operation.

On reference to the accompanying drawings, Figure 1 is a perspective view of my improved milk-pan; Fig. 2, a sectional elevation of the same.

A is the body of the pan, and B the cover, both being constructed of tinned plates or other suitable material. The cover, which is cone-shaped and surmounted with a tapering tube, *a*, fits snugly to, but so as to be readily removed from, the body of the pan. In the side and near the upper edge of the latter are any convenient number of openings, *b*, which, together with the upper end of the tube *a*, are covered with perforated tin plates, fine wire-gauze, or other equivalent material.

It is well known to dairymen that, in order to insure the effectual and rapid development of the cream on the surface of the milk, it is necessary that the latter should be exposed in vessels situated in a cool and damp atmosphere; hence the general use of spring-houses on dairy-farms. Such damp localities are, however, infested to a greater or less degree with many loathsome insects—such as lizards, bugs, flies, and gnats—which gain access to the milk when exposed in unprotected pans. It is to obviate this nuisance, and at the same time to insure the exposure of the milk to a constant current of cold air, that my improved milk-pan is especially designed.

The natural heat of the milk when first deposited in the pan is about 90°. Therefore, when the cover is placed in its proper position, the air within the vessel, becoming heated, will rise and pass through the tapering tube *a*, while the damp air from the spring-house or cellar will rush through the perforations of the plates on the side of the pan. Thus a constant draft of cold air passes through the pans, and the surface of the milk is exposed to a current of cold air, which facilitates the development of the cream; nor does this draft cease as the milk becomes gradually cooled, for as the cream rises to the surface a chemical action takes place and a gas or gases are generated, and these rise and pass off through the tapering tube *a*, while the cold air rushes into the side openings to fill the vacuity. The perforations of the plates which cover these side openings and the top of the tube *a* are so minute that the smallest insect cannot gain access to the interior of the pan, and so numerous as to admit of a free entrance of cold air below and a free exit of the warm air or gases above.

My improved pan may be used to advantage for storing bread, cakes, and other cooked articles of diet, inasmuch as it affords that free access of fresh air and efficient ventilation so necessary in preserving such articles from molding.

It will be evident that my improved pan admits of a variety of efficient modifications; and therefore, without confining myself to the precise form of pan or to the precise arrangement of openings herein described, I claim and desire to secure by Letters Patent—

As a new manufacture, a pan with a detachable or hinged cover, forming when combined a vessel closed, with the exception of a series of minute perforations below for the access of cold air and a suitable distance above the latter another series of perforations for the exit of warm air and gases, and otherwise constructed substantially as herein set forth, and for the purpose specified.

In testimony whereof I have signed my name to this specification before two subscribing witnesses.

E. L. PRATT.

Witnesses:
 HENRY HOWSON,
 HORACE SEE.